UNITED STATES PATENT OFFICE.

DAVID AVERY AND ROWLAND T. D. WILLIAMS, OF RISDON, HOBART, TASMANIA, AUSTRALIA, ASSIGNORS TO ELECTROLYTIC ZINC COMPANY OF AUSTRALASIA PROPRIETARY LIMITED, OF MELBOURNE, VICTORIA, AUSTRALIA.

TREATMENT OF ZINC SOLUTIONS PREPARATORY TO THE RECOVERY OF ZINC BY ELECTRODEPOSITION.

1,347,200.  Specification of Letters Patent.  Patented July 20, 1920.

No Drawing.  Application filed July 25, 1918. Serial No. 246,642.

*To all whom it may concern:*

Be it known that we, DAVID AVERY and ROWLAND THOMAS DRYLL WILLIAMS, subjects of the King of Great Britain, residing at Risdon, Hobart, in the State of Tasmania, Commonwealth of Australia, have invented certain new and useful Improvements in the Treatment of Zinc Solutions Preparatory to the Recovery of Zinc by Electrodeposition, of which the following is a specification.

This invention relates to certain improvements in the treatment of zinc solutions preparatory to the recovery of zinc by electrolysis and refers more especially to the purification of zinc sulfate solutions obtained by leaching ores, concentrates or other zinc bearing material with sulfuric acid preparatory to the electrodeposition of zinc from such solutions.

In the recovery of zinc by electro deposition it has been found that the presence of certain impurities interferes with and detrimentally affects the deposition of the zinc and for effective working it is essential that such impurities should be removed especially in view of the fact that such impurities accumulate by the continuous circulation of the solutions.

The usual methods of purification of zinc sulfate solutions preparatory to electrolysis comprise treatment with limestone for the precipitation of iron and with finely divided zinc in the form of zinc dust or blue powder for the precipitation of any silver, arsenic, antimony, copper or cadmium. These methods of treatment have not been found effective in the removal of cobalt which has been found to be a substance which most adversely affects the subsequent electrodeposition of the zinc.

We have discovered however that in the aforesaid treatment with zinc dust the removal of cobalt is more effectively secured if arsenic be present.

This invention comprises a method of removing cobalt from zinc bearing electrolytes which consists of insuring the presence of arsenic in the solution (such as zinc sulfate solution) in the purification treatment with zinc dust.

In carrying out this process it is necessary to have in the zinc sulfate solution from which it is desired to remove the cobalt a sufficient quantity of a soluble arsenic compound. This arsenic may be added to the solutions in any convenient way as for example by the addition to the solution of arsenious acid or sodium arsenite, or by the addition to the calcines before leaching of arsenic bearing calcines or arsenical baghouse material or in some cases by additions of other arsenical ores to the original ore before roasting.

Whatever means may be adopted for insuring the presence of arsenic it is necessary that there should be a sufficient quantity of arsenic left in the solutions after treatment with limestone and before treatment with zinc dust. The solution is then treated with zinc dust or blue powder in the usual way but this precipitation of cobalt and its removal is facilitated by heating the solutions to about 60° C. The addition of zinc dust for the precipitation of impurities is preferably made in stages—that is to say at first such quantity of zinc dust is added as is required for the precipitation of the copper, cadmium, and arsenic; then a further quantity of zinc dust as is required for the major portion of the cobalt; and finally a further quantity of zinc dust to insure pure solutions and to prevent resolution of cadmium and other metals and substances which tend to interfere with the electrodeposition of the zinc. The quantities of zinc dust required at each addition are somewhat in excess of the calculated chemical equivalents of the impurities to be removed especially when dealing with very small quantities of such impurities but the requirements may be ascertained in each case by a complete laboratory test.

If complete purification and removal of cobalt is desired it has been found that the presence of a compound of copper is necessary and in practice if sufficient copper is not already present we have found it desirable to add a small quantity of a soluble copper salt such as copper sulfate to the solutions before or during precipitation. Furthermore the reactions involved in the purification of the solutions in the manner indicated are facilitated if a small quantity of free acid is present in the solutions.

By way of illustrating an application of this invention the following is given as an example:—

In the purification of a solution containing 0.2 grams of copper, 0.2 grams of cadmium and 0.01 grams of cobalt per liter an addition was made to the solution of an amount of a compound of arsenic equivalent to 0.075 grams of arsenic per liter. The solution was then made slightly acid and was heated to a temperature of about 60° C. and agitated in such a way as to avoid as far as possible the introduction of air. An amount of zinc dust or blue powder was then added equivalent to 0.7 grams per liter and the mixture agitated again for a period of about 30 minutes. A further quantity of zinc dust equivalent to 0.5 grams per liter was then added and the mixture again agitated for a further period of about 30 minutes. A still further quantity of zinc dust equivalent to 0.2 grams per liter was added and the mixture again agitated for a period of from 30 minutes to one hour. The solution was then found to be sufficiently purified and was filtered and subjected to electrolysis.

We claim:—

1. In the treatment of zinc solutions containing cobalt preparatory to recovery of zinc by electrodeposition the method of removing cobalt which comprises precipitating the cobalt by means of zinc dust in the presence of arsenic.

2. In the treatment of zinc solutions containing cobalt preparatory to recovery of zinc by eletrodeposition the method of removing cobalt which comprises precipitating the cobalt by means of zinc dust in the presence of arsenic at a temperature of about 60° C.

3. In the treatment of zinc solutions preparatory to recovery of zinc by electrodeposition the method of removing cobalt which comprises adding to the electrolyte a soluble arsenic compound and effecting the precipitation of the cobalt and the arsenic by means of zinc dust at a temperature of about 60° C.

4. In the treatment of zinc solutions preparatory to recovery of zinc by electrodeposition the method of removing cobalt which comprises adding to the material to be treated a compound of arsenic before leaching and then effecting the purification of the electrolyte and the precipitation of the cobalt and the arsenic by means of zinc dust at a temperature of about 60° C.

5. In the treatment of zinc solutions preparatory to recovery of zinc by electrodeposition the method of removing the cobalt which comprises adding a compound of arsenic and a compound of copper and effecting the purification of the electrolyte and the precipitation of the cobalt with zinc dust at a temperature of about 60° C.

6. In the treatment of zinc solutions preparatory to the recovery of zinc by electrodeposition the method of removing cobalt which comprises adding a compound of arsenic and a compound of copper, making the solution slightly acid, heating the solution to a temperature of about 60° C., agitating in such without access of air, adding zinc dust or blue powder in separate stages with agitation between each such addition, and finally separating the solution from the precipitate; substantially as described.

In testimony whereof I affix my signature in presence of two witnesses.

DAVID AVERY.

Witnesses:
Wm. A. Hack,
G. R. Cullen.

In testimony whereof I affix my signature in the presence of two witnesses.

ROWLAND T. D. WILLIAMS.

Witnesses:
Richard Wendell,
B. O. Wood.